Oct. 14, 1924.
A. M. JOHNSON ET AL
1,511,763
TRAFFIC SIGNAL
Filed June 24, 1924    2 Sheets—Sheet 1
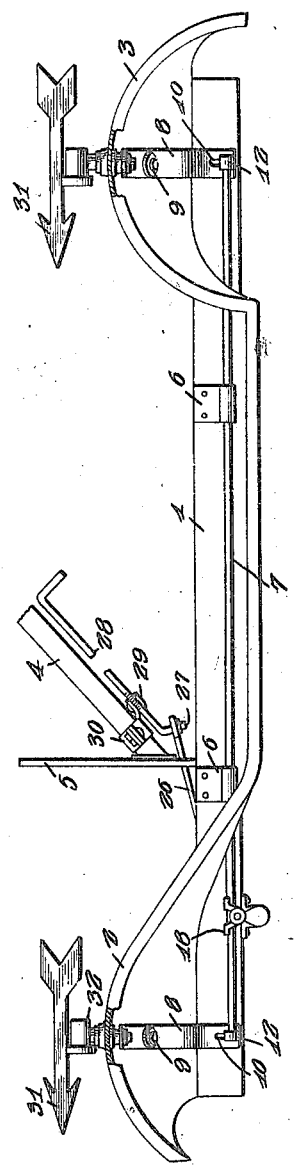
A. M. Johnson
AND
U. G. Blanton
Inventors
By [signature]
Attorneys Oct. 14, 1924. 1,511,763
A. M. JOHNSON ET AL
TRAFFIC SIGNAL
Filed June 24, 1924 2 Sheets-Sheet 2
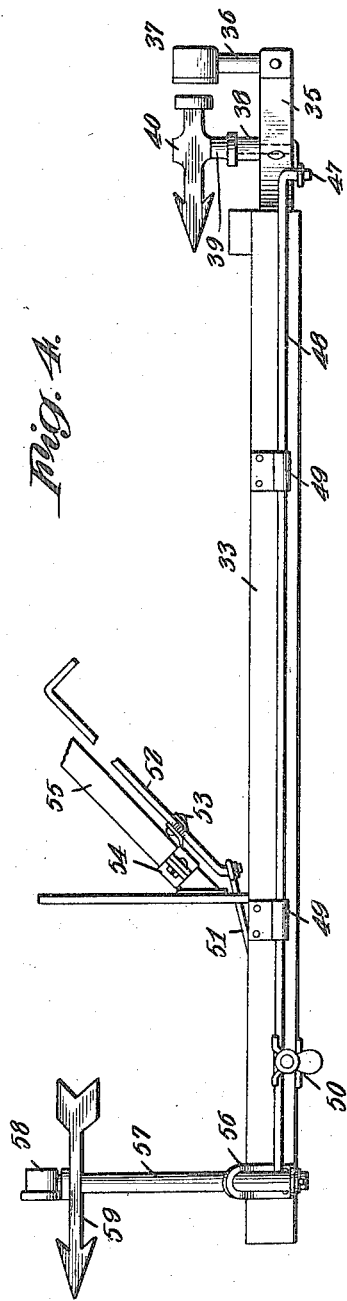
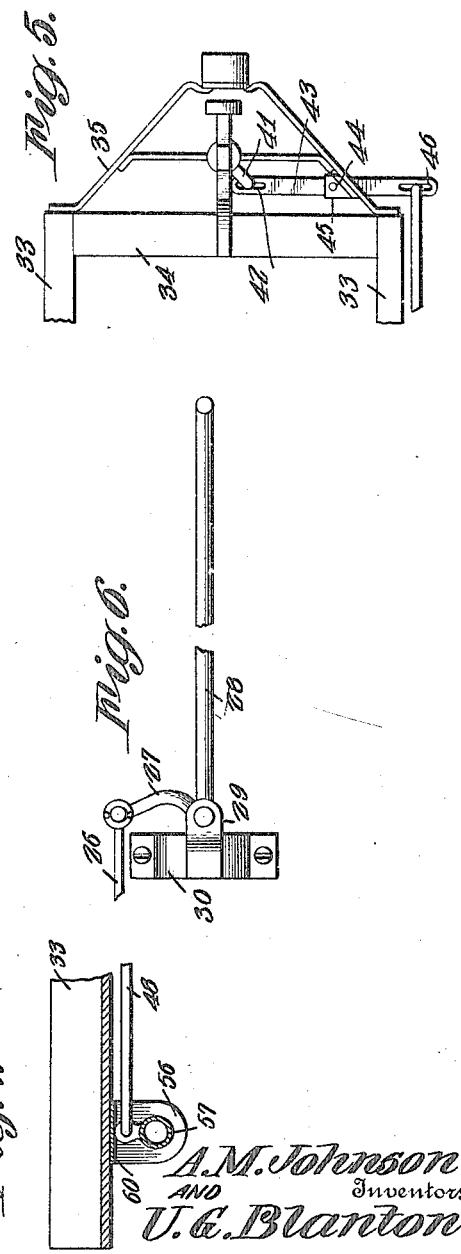

Patented Oct. 14, 1924.

1,511,763

UNITED STATES PATENT OFFICE.

ADOLPHUS MARION JOHNSON AND ULYSESS GRANT BLANTON, OF CHAMBLEE, GEORGIA.

TRAFFIC SIGNAL.

Application filed June 24, 1924. Serial No. 722,070.

*To all whom it may concern:*

Be it known that we, ADOLPHUS M. JOHNSON and ULYSESS G. BLANTON, citizens of the United States, residing at Chamblee, in the county of De Kalb and State of Georgia, have invented a new and useful Traffic Signal, of which the following is a specification.

This invention aims to provide novel means whereby a driver of a vehicle can advise the drivers of other vehicles, and pedestrians, as to his intentions relative to the way in which the vehicle is to be operated.

It is within the province of the disclosure to improve generally and to enhance the utility of devices of that type to which the invention appertains.

With the above and other objects in view which will appear as the description proceeds, the invention consists in the novel construction and arrangement of parts hereinafter described and shown in the drawings, it being understood that a mechanic, working within the scope of what is claimed, may make alterations without departing from the spirit of the invention.

In the drawing:—Figure 1 shows in side elevation, a device constructed in accordance with the invention, parts being broken away; Figure 2 is a section taken through one of the fenders and attendant parts; Figure 3 is a section taken through a portion of the frame of the vehicle and showing one of the shafts; Figure 4 is a side elevation showing a modification; Figure 5 is a fragmental top plan showing a portion of the device depicted in Figure 4; Figure 6 is a view disclosing certain of the connections; and Figure 7 is a sectional view showing another of the connections.

The numeral 1 marks the chassis or frame bar of a vehicle, the forward fender being shown at 2 and the rear fender at 3. The steering post column is marked by the numeral 4 and the dash board is shown at 5.

Bearings 6 are mounted on the outer surface of the frame bar 1 and in the bearings, a rod or connecting member 7 is mounted for right-line reciprocation. Angular levers 8 are located beneath the fenders 2 and 3 and are fulcrumed at 9, intermediate their ends on the fenders, the levers 8 being provided at their lower ends with elongated slots 10 receiving inwardly extended fingers 11 secured at 12 to the operating member or rod 7.

Shafts 14 are disposed vertically and are journaled in the fenders 2 and 3. At their lower ends, the shafts are supplied with crank arms 15 having studs 16 received in properly shaped openings in the upper ends of the levers 8. A bearing 17 is secured at 18 to the rod 7. A shaft 19 is mounted horizontally for rocking movement in a bearing 20 on the frame bar 1. The shaft 19 has an angular crank arm 21 received in the bearing 17 on the rod 7 and held therein for rocking movement, as shown at 22. A shaft 19 is provided at its inner end with an angular crank arm 23 thereon and is held movably, as at 24, an eye 25 on a link 26 connected to a lateral arm 27 on a lever 28 fulcrumed for lateral swinging movement on an extension 29 forming part of a collar 30 mounted on the column 4. The upper ends of the shafts 14 are supplied with indicators 31, which may be arrows, lamps 32 being interposed in the shaft 14 and being located below the indicators 31 to illuminate them.

In practical operation, when the lever 28 is swung laterally on its fulcrum 29, the link 26 will rock the shaft 19 in the bearing 20, by way of the arm 23, the arm 23 imparting longitudinal movement to the rod 7, the levers 8 being tilted on their fulcra 9, the arms 15 rotating the shafts 14, and the indicators 31 being turned laterally, toward the obvious purpose of making manifest the direction in which the vehicle is to be driven.

In the form shown in Figures 4 to 7, the frame bars appear at 33 and are connected by a rear bar 34. An auxiliary frame 35 extends rearwardly from the main frame and is provided at its rear end with an upstanding support 36 carrying a lamp 37 adapted to project its rays forwardly. The frame 35 carries a bearing 38 wherein is journaled a shaft 39 provided at its upper end with an indicator 40, which may be an arrow, the indicator being located directly in front of the lamp 37, so that it can be illuminated by the lamp. The shaft 39 is supplied at its lower end with a crank 41 received in an elongated slot 42 in a transverse lever 43 which is fulcrumed at 44, intermediate its ends, on a bracket 45 carried by one side portion of the auxiliary frame 35. An elongated slot 46 is fashioned in the outer end of the lever 43 and is adapted to receive a depending finger 47 on an operating member or rod 48 mounted for right-line sliding movement in bearings 49 mounted on one of the frame bars, 33. The rod 48 is connected as indicated at 50, with a shaft like the shaft 19 of Figure 3, Figure 3 being applicable to both Figure 4 and Figure 1. The link, corresponding to the link 26, is designated by the numeral 51, the lever, corresponding to the lever 28, is shown at 52, and is fulcrumed as hereinbefore explained, and as indicated at 53, on the collar 54 which is carried by the steering column 55. A bearing 56 is mounted on one of the frame bars 33 and in the bearing, a hollow vertical shaft 57 is journaled, the shaft being hollow to permit conductors (not shown) to pass upwardly to a lamp 58 on the upper end of the shaft, the shaft carrying an indicator or arrow 59 located immediately below the lamp 58. The shaft 57 is provided near to its lower end with an arm 60 wherein the forward end of the rod 48 is pivotally mounted.

The way in which the lever 52 operates the rod 48 to impart longitudinal movement thereto, will be understood readily and it is recalled that Figure 3 is applicable to the form shown in Figure 4. From the rod 48, motion is imparted to the shaft 39 by way of the lever 43 and the crank 41, the indicator 40 being turned accordingly. In the similar way, the rod 48 operates the shaft 57 and the indicator 59 through the instrumentality of the arm 60, shown clearly in Figure 7.

We claim—

1. The combination with the chassis bar and the steering column of a vehicle, of a lever fulcrumed on the column and under the control of an operator, an operating member mounted for right-line sliding movement on the bar, a link pivoted to the lever, a shaft disposed transversely of the bar and journaled thereon, the shaft having inner and outer cranks connected, respectively, to the link and to the operating member, a signal movable on the vehicle, and means for connecting the signal operatively with the operating member.

2. The combination with the chassis bar and the fender of a vehicle, of a lever fulcrumed on the vehicle and under the control of an operator, an operating member mounted for right-line sliding movement on the bar, a link pivoted to the lever, a shaft disposed transversely of the bar and journaled thereon, the shaft having inner and outer cranks connected, respectively, to the link and to the operating member, a shaft journaled on the fender, a signal carried by the last-specified shaft, a lever disposed below the fender and fulcrumed intermediate its ends on the fender, means for connecting the lower end of the last-specified lever with the operating member, and means for connecting the upper end of the last-specified lever with the last-specified shaft to secure rotation of said shaft.

In testimony that we claim the foregoing as our own, we have hereto affixed our signatures.

ADOLPHUS MARION JOHNSON.
ULYSESS GRANT BLANTON.